May 21, 1929.  G. I. LEWIS  1,714,429
LAMP
Filed July 31, 1925
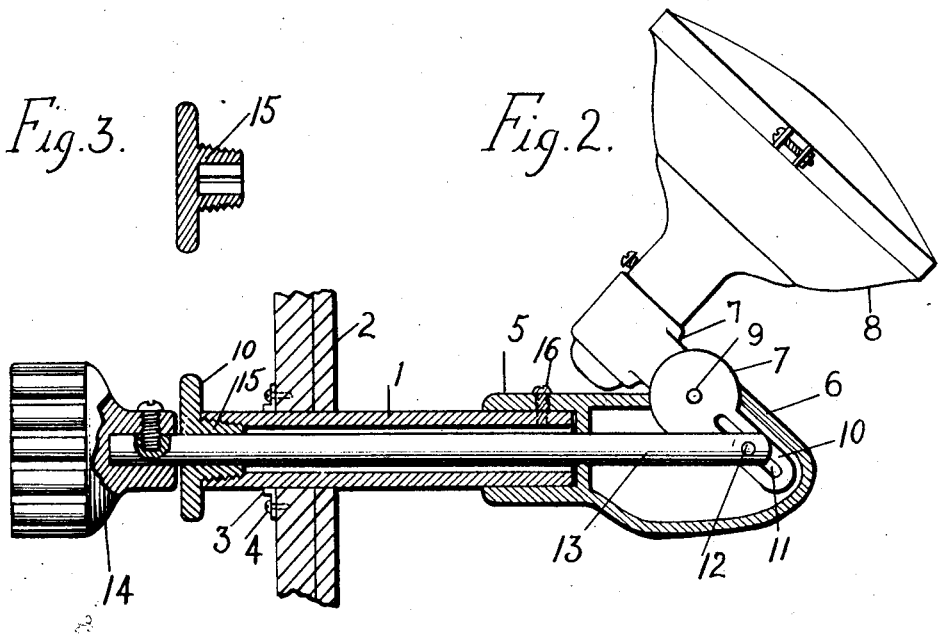
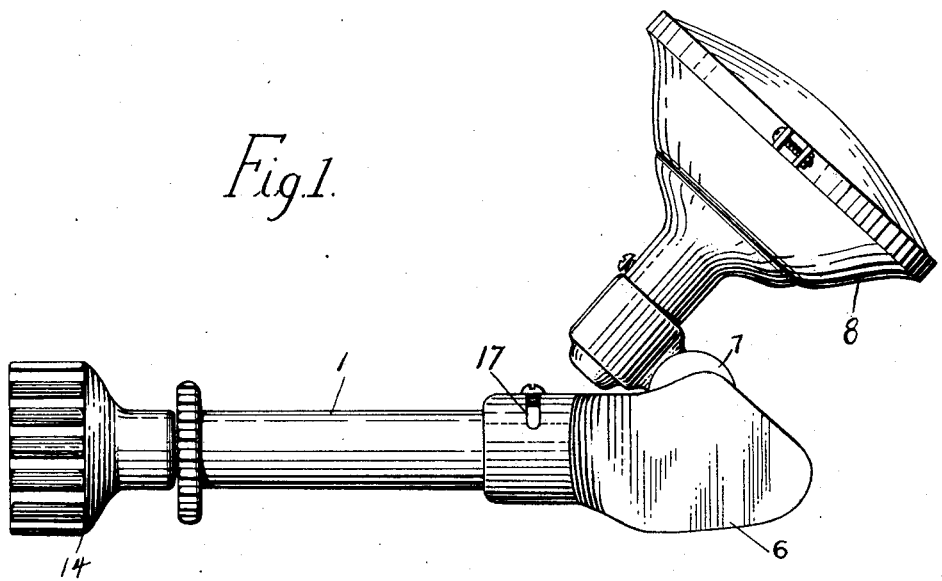
Inventor.
George I. Lewis
By Arthur N. Ewald,
Attorney.

Patented May 21, 1929.

1,714,429

UNITED STATES PATENT OFFICE.

GEORGE I. LEWIS, OF CINCINNATI, OHIO, ASSIGNOR TO THE K-D LAMP COMPANY, A CORPORATION OF OHIO.

LAMP.

Application filed July 31, 1925. Serial No. 47,360.

My invention relates to lamps and has particular reference to the provision of a spot lamp for motor vehicles arranged for directional control inside the vehicle.

The principal object of this invention is to provide a simple, inexpensive and effective spot light in which means are supplied for directionally controlling the rays projected by the lamp from the inside of a vehicle.

Other objects of the invention will appear from the following detailed description thereof.

In the drawings:

Figure 1 is an elevation of a lamp constructed in accordance with this invention.

Figure 2 is a longitudinal section of the operating mechanism.

Figure 3 is a section of the lock nut.

The numeral 1 indicates a tube or sleeve adapted to extend through the frame 2 of a motor vehicle. The sleeve 1 may be provided with a collar 3 having a flange 4 by means of which the sleeve is secured to the vehicle. Rotatably mounted on the outer end of the sleeve 1 by means of a socket 5 which fits over said end, is a casing or head 6 in which a supporting arm 7 for a spot lamp 8 is pivotally mounted at 9. The free end 10 of the arm is inside the casing 6 and is provided with a slot 11 for a pin 12 carried by the end of a rod 13. The rod 13 extends inwardly through the sleeve 1 and beyond the inner end thereof and has secured thereon an operating button or handle 14. The inner end of the sleeve 1 is provided with an interior thread adapted to receive a wedge shaped split nut 15 by means of which the rod 13 may be securely fixed against both longitudinal and rotary movement in the sleeve. The rotary movements of the head 6 about the sleeve 1 are limited by means of a pin 16 carried by the sleeve and a slot 17 in the head through which the pin extends.

The operation of the device will be apparent to those skilled in the art to which the same appertains, from the foregoing description thereof. In order to adjust the lamp the nut 15 is loosened after which the button 14 may be turned rotating the rod 13 which carries the head 6 and with it the lamp, thus effecting adjustments of the lamp in a vertical plane transverse to the direction of the axis of the vehicle. Longitudinal movements of the rod 13 may be effected also by the button 14 rotating the arm 7 about the axis 9, thus effecting directional adjustments of the lamp 8 in a vertical plane parallel to the axis of the vehicle. When the desired adjustment has been attained the same may be secured by means of tightening the button 14 as will be understood.

Various modifications in details of construction may be made without departing from the spirit and scope of the said invention, as defined by the appended claim.

Having thus fully described my invention, what I claim as new and desire to secure by Letters Patent is:

A device of the character described, comprising a sleeve adapted to extend through the frame of a vehicle, an enclosed head, the rear end of said head being provided with a socket arranged to fit over the outer end of said sleeve and to form a rotating bearing for said head thereon, the base of said socket forming a thrust bearing for said sleeve, an arm pivotally mounted in said head, a spot light mounted in one end of said arm, a rod extending through said sleeve and beyond the inner end thereof, a pivotal connection between said rod and arm, operating means carried by the free end of said rod, means for locking said rod against longitudinal and rotary movements, and means for limiting the rotary movement of said head.

GEORGE I. LEWIS.